Dec. 26, 1950 — J. R. RHINEHART — 2,535,158
CALF WEANER
Filed Nov. 19, 1945
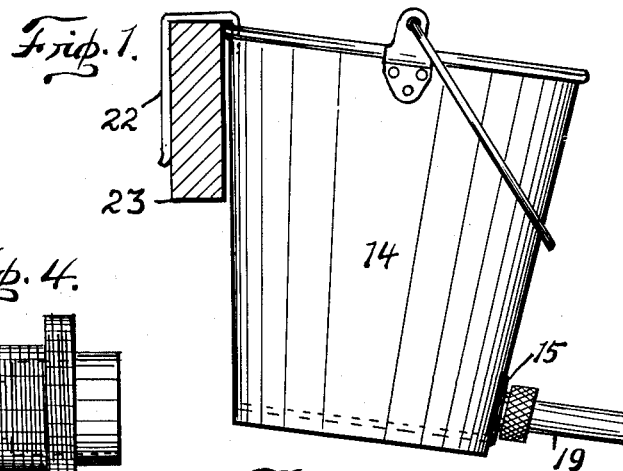
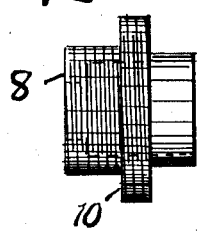
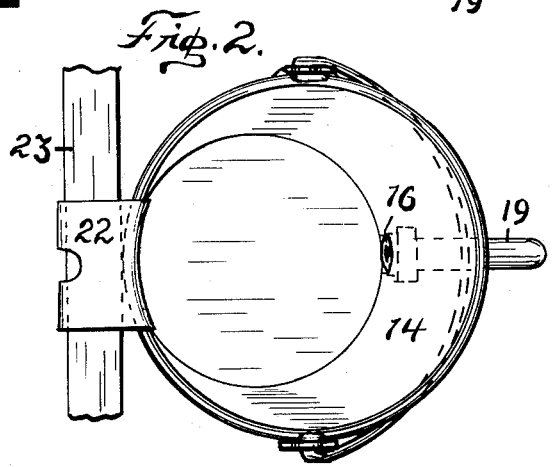
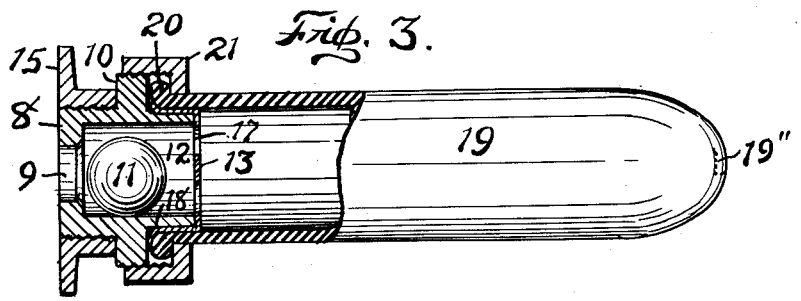
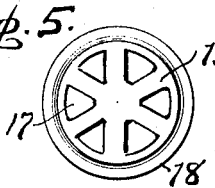
John R. Rhinehart, INVENTOR.

Patented Dec. 26, 1950

2,535,158

UNITED STATES PATENT OFFICE 2,535,158

CALF WEANER

John R. Rhinehart, Fort Wayne, Ind.

Application November 19, 1945, Serial No. 629,568

1 Claim. (Cl. 119—71)

This invention relates to improvements in a calf weaner of the type wherein a milk pail is provided with a flexible nipple located exteriorly of the pail at the lower portion thereof, and through which the contents of the pail is withdrawn by a suckling animal, as in nursing.

An object of the invention is to provide a fixture containing a valve and associated parts for connecting the nipple with the pail, so constituted as to permit ready disassemblage of the separable parts of the device to facilitate cleansing thereof.

Another object of the invention is to afford a valvular coupling by which to removably secure a nursing nipple to a pail so constructed as to be readily disassembled and replaced without use of tools.

Other objects and advantages of the invention appear in the following description.

An illustrative embodiment of the invention is shown in the accompanying drawings, in which:

Fig. 1 is a side elevational view of a structure in which the invention is incorporated, the support for the structure being in section;

Fig. 2 is a top plan view of the structure projected from Fig. 1;

Fig. 3 is a side elevational view, drawn to an increased scale, showing the nipple and the valvular coupling by which the nipple is secured to a pail, a portion being broken away;

Fig. 4 is a side elevational view of the valvular coupling; and

Fig. 5 is a front end elevational view of a perforated thimble for confining the valve in the nipple.

The illustrative embodiment of the invention consists of a chambered coupling 8 having in one end thereof a valve opening 9, an exterior annular shoulder 10, a spherical valve 11 in its chamber 12 and a perforated thimble 13 disposed on the other end of the coupling by which the valve is confined loosely in the chamber. The valvular coupling is secured to a milk pail 14 by means of an internally threaded anchor ring 15 that is soldered or otherwise secured as in ordinary practice to the wall of the pail at a point adjacent the bottom thereof, an opening 16 being made in the wall of the pail coincident with the bore in the ring.

The shoulder 10 around the coupling is located approximately midway between the ends thereof and is provided with peripheral screw threads, and that portion of the coupling between the shoulder and the intake end is externally threaded and fits within the anchor ring. The outer end portion of the coupling is smooth and has fitted thereon the thimble having numerous passageways 17 to permit discharge therethrough of liquid as it passes from the pail through the valve opening and the coupling by the valve. The thimble has an external annular flange 18 that fits against the adjacent face of the shoulder 10 for the purpose hereinafter referred to.

A flexible nipple 19 of an ordinary type used in feeding suckling animals is fitted over the thimble so the bead 20 around its inner end is seated against the flange 18 on the thimble where it is forcefully held by an internally flanged ring 21 that is threaded on the shoulder 10 of the coupling. In this manner the nipple is supported in sealed connection with the coupling 8 in proper position for use.

Preferably, the pail has secured to its upper portion at a point opposite the anchor ring a fixture 22 consisting of an angular plate which is secured permanently to the pail in any suitable manner, the outer pendent portion of the plate being bifurcated as shown in Fig. 2. The fixture is adapted to support the pail when disposed on a fence rail 23 or other similar support. In some instances, the fixture may be inserted with its bifurcated portion extending through the meshes of a wire fence (not shown). In either event, the pail is held by the fixture from lateral wobbling when the apparatus is supported in position for use.

In use, the parts are assembled as illustrated in Fig. 3 arranged so that liquid food supplied to the pail is withdrawn through the valvular coupling and nipple in the usual manner by the suckling. Backflow of the liquid food from the nipple into the pail is obviated by action of the valve, and emission of the liquid from the nipple is through a slit in the tip of the nipple (indicated by the dotted line 19'') as in the customary manner Occasionally, as need be, the separable parts including the nipple 19, thimble 13, coupling 8, anchor ring 21, and valve 11 are disassembled, cleansed and reassembled, thus to promote sanitation.

Variations from the particular construction above disclosed may be resorted to by the exercise of skill in the art, without departure from the spirit or scope of the invention.

What I claim is:

A fixture for attaching a flexible nipple to a feed pail, consisting of an anchor ring attachable to said pail, a chambered coupling threaded in the outer end of said ring provided with a threaded shoulder that abuts said ring and having in its chamber an outflow valve, a thimble disposed on the distal end of said coupling provided with outlet passageways, and a flanged ring threaded on said shoulder for securing a flexible nipple about said thimble on the coupling.

JOHN R. RHINEHART.

REFERENCES CITED

The following references are of record in the file of this patent:

UNITED STATES PATENTS

| Number | Name | Date |
| --- | --- | --- |
| 303,673 | Small | Aug. 19, 1884 |
| 545,928 | Whitmore | Sept. 10, 1895 |
| 1,062,657 | Moore | May 27, 1913 |
| 1,289,737 | Greenfield | Dec. 31, 1918 |
| 1,896,028 | Burvenick | Jan. 31, 1933 |
| 1,972,375 | Coyner | Sept. 4, 1934 |
| 2,158,226 | Elsey | Mar. 16, 1939 |
| 2,275,397 | Davies | Mar. 3, 1942 |
| 2,350,215 | Christensen | May 30, 1944 |
| 2,382,489 | Koppel | Aug. 14, 1945 |

FOREIGN PATENTS

| Number | Country | Date |
| --- | --- | --- |
| 531,916 | Great Britain | Jan. 14, 1941 |
| 286,847 | Italy | July 24, 1931 |
| 176,838 | Switzerland | May 15, 1935 |